No. 792,775. PATENTED JUNE 20, 1905.
J. C. HURLEY.
LUMBER TALLY OR RECORDER.
APPLICATION FILED OCT. 14, 1904.
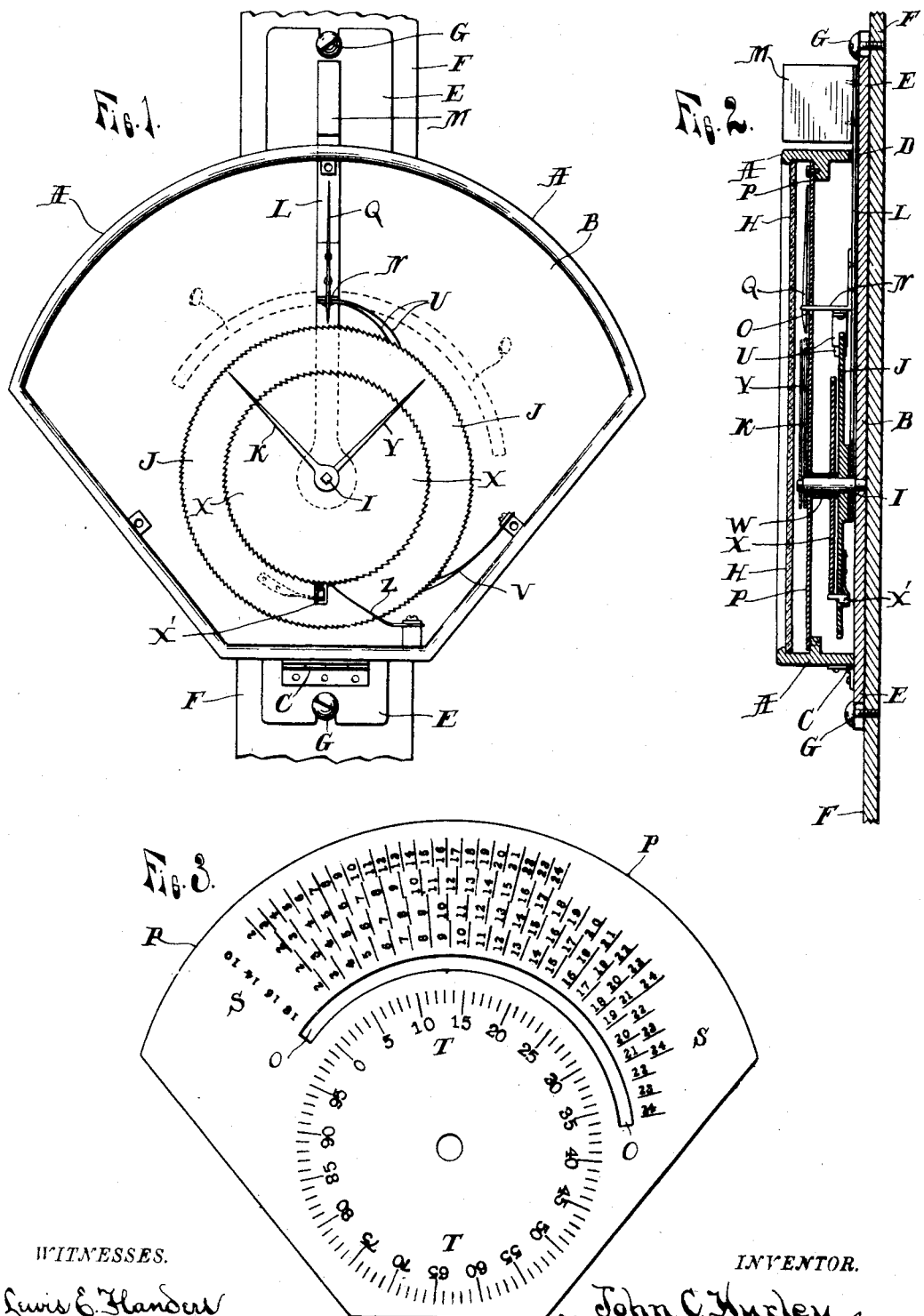
WITNESSES. INVENTOR.
John C. Hurley
Attorneys.

No. 792,775.   Patented June 20, 1905.

UNITED STATES PATENT OFFICE.

JOHN C. HURLEY, OF DETROIT, MICHIGAN.

LUMBER TALLY OR RECORDER.

SPECIFICATION forming part of Letters Patent No. 792,775, dated June 20, 1905.

Application filed October 14, 1904. Serial No. 228,378.

*To all whom it may concern:*

Be it known that I, JOHN C. HURLEY, a citizen of the United States of America, residing at Detroit, in the county of Wayne and State of Michigan, have invented certain new and useful Improvements in Lumber Tallies or Recorders, of which the following is a specification, reference being had therein to the accompanying drawings.

This invention relates to certain new and useful improvements in lumber tallies or recorders, and has for its object to make a device which may be conveniently carried in the hand or attached to the lumberman's scale and which will instantly give the number of feet in a board of any length or width and simultaneously record the same upon a dial for the purpose.

To this end the invention consists in the peculiar construction, arrangement, and combination of parts, all as more fully hereinafter described, and shown in the accompanying drawings, in which—

Figure 1 is a front elevation of the device with the dial removed to show the interior mechanism; Fig. 2, a vertical central transverse section therethrough, and Fig. 3 a front elevation of the dial.

A is a cast-metal casing, preferably of brass or aluminium, secured to a back plate B by a hinge connection C at its lower end, and D is a slot formed in the casing at its upper end adjacent to the back plate.

E represents lugs or projections integrally formed with the back plate B and provided with suitable notches, so that the device may be secured to a lumberman's scale F by screws G, if desired.

H is a glass front in the casing, and I is a shaft or arbor journaled in the back plate and carrying the wheel J, fast thereon, and hand K, mounted on the squared end of said shaft.

L is a lever pivotally mounted on the shaft I at its inner end and provided with an operating-handle M at its outer end, said lever being adapted to travel in the slot D.

N is an arm or bracket secured to the lever intermediate its ends and adapted with its free end to project through a segmental slot O in the dial P, said arm carrying a double pointer Q, adapted to register at its opposite end with both the scales S T, giving the various widths of boards and number of feet in each, respectively.

U represents spring-pawls carried by the arm N, adapted to engage ratchet-teeth on the periphery of the wheel J—three hundred in number—said pawls being so arranged that when one is in the bottom of a tooth the other is on top of the next tooth, and V represents similar spring-pawls for the purpose of preventing the retrograde movement of the wheel, said pawls being secured to one of the supports for the dial. If desired, the wheel J could be provided with six hundred teeth and but a single set of pawls used, an extra set being the equivalent to the extra three hundred teeth; but owing to the fineness of the teeth, the difficulty of making, and liability to wear I prefer to make but three hundred, although six hundred divisions or stops are required, as all lumber areas down to one-sixth of a square foot are recorded, sixths being the least common fraction used in the lumber trade.

W is a sleeve on the shaft I, extending through an opening in the dial P, carrying a wheel X at its inner end provided with one hundred teeth and a hand Y at its outer end adapted to register with the circular scale T for the purpose of recording hundreds of feet, the hand K on the shaft I recording the number of feet on the same scale, so that with each revolution of the hand K the hand Y is advanced one notch, representing one hundred square feet.

Z is a spring pawl or back-stop for the purpose of preventing the retrograde movement of the wheel X, and X' is a spring-dog carried by the under side of the wheel J and projecting through an opening in the wheel in proximity to the teeth on the wheel X, but normally held out of engagement therewith, so that with each revolution of the wheel J the upper end of the dog X' will strike the inclined side of the spring-pawl Z and be forced into engagement with the teeth of the wheel X and carry the same with it for the distance of one tooth when the pawl Z will immediately spring back into place on the next tooth.

The figures "10," "14," "16," and "18"

at the head of each segmental column represent in feet the various lengths of boards and the figures running from "2" to "24" in each column the width in inches of the various boards, so that all the operator has to do is to measure the width of his board with his scaling-stick, the length being determined at a glance, and if he finds his board to be eight inches wide and of eighteen feet length he moves the lever L until the outer end of the needle Q registers with the line under the figure "8" in the eighteen-foot column, when the inner end of the needle will register with the graduation-mark "12" on the circular scale, meaning that there are twelve square feet in a board of those dimensions, and the amount is recorded first by the hand K and then by the hand Y when the amount gets into the hundreds of feet, so that at the end of a certain period the lumber-tallier can tell just exactly how many thousand feet of lumber he has measured instead of being required to mark down in regular columns on a sheet of paper arranged for the purpose just how many boards of each size he has measured and then adding up the total as heretofore.

I have made no scale for twelve-foot boards, as this is recorded directly by the inner end of the double pointer Q on the circular scale, since a twelve-foot board one inch wide would contain but one square foot, two inches wide two square feet, &c., no special scale being necessary as in other lengths.

If desired, the scales may be arranged in vertical columns and a sliding instead of a rotating indicator used, all of which I deem within the spirit of my invention.

Having thus fully described my invention, what I claim is—

1. In a device of the character described the combination of a pair of ratchet-wheels, means for moving one of said wheels, a spring-pawl engaging the other wheel, and a spring-dog carried by said movable wheel coöperating with said pawl to impart a step-by-step movement to the other wheel.

2. In a device of the character described the combination with the casing, of a shaft journaled in the casing, a fast and a loose wheel carried by said shaft, a spring-pawl engaging the loose wheel and a spring-dog carried by the fast wheel coöperating with said pawl, indicating devices carried by said wheels and means for turning the fast wheel.

3. In a device of the character described, the combination of a shaft, a hand and ratchet-wheel carried by said shaft, a lever carrying a pointer and pawls engaging said wheel, a second ratchet-wheel sleeved on the shaft, a hand carried by said wheel, spring-pawls or back-stops engaging said wheels and a spring-dog carried by one wheel and engaging the spring-pawl of the other wheel for the purpose described.

4. In a device of the character described, the combination with the indicating-dial and casing, of a ratchet-wheel journaled therein, a lever carrying a pawl engaging said wheel, a second ratchet-wheel sleeved on the shaft of the first-named wheel, spring-pawls engaging said wheels, a spring-dog carried by one wheel and coöperating with the spring-pawl of the other wheel and indicating devices carried by said lever and wheels for the purpose described.

5. In a lumber-register, the combination with the casing, of a graduated dial, a shaft journaled in said casing, a hand and a ratchet-wheel carried by said shaft, an operating-lever pivoted on said shaft, a double pointer and pawls carried by said lever, said pawls engaging the teeth of said wheel, a sleeve on the shaft, a hand and a ratchet-wheel carried by said sleeve, a spring-pawl engaging said wheel and a spring-dog carried by the other wheel coöperating with said spring-pawl for the purpose described.

6. In a lumber-register, the combination with the casing, of a shaft journaled in said casing, a hand and a ratchet-wheel carried by said shaft, an operating-lever pivoted on said shaft, a bracket on said lever, a double pointer and pawls carried by said bracket, said pawls engaging said wheel, a sleeve on the shaft, a hand and a ratchet-wheel carried by said sleeve, a spring-pawl engaging said wheel and a spring-dog carried by the other wheel coöperating with said spring-pawl to turn the aforementioned wheel through the space of one tooth with each revolution of the other wheel.

7. In a lumber-register, the combination with the casing, of a dial provided with a segmental slot and a circular and segmental scales on opposite sides of said slot, of a shaft journaled in the casing, a ratchet-wheel and a hand coöperating with the circular scale carried by said shaft, a lever pivoted on the shaft, a bracket on said lever, a double pointer and pawls coöperating with said scales and wheel respectively, carried by said bracket, a sleeve on the shaft, a ratchet-wheel and a hand coöperating with the circular scale carried by said sleeve, a spring-pawl engaging said wheel and a spring-dog carried by the other wheel coöperating with said pawl to turn said wheel through the space of one tooth with each revolution of the other wheel.

8. In a lumber-register, the combination of a dial provided with a circular and segmental scales arranged in relation to each other, a ratchet-wheel and a hand carried thereby coöperating with the circular scale, a lever carrying a pawl engaging said wheel, a pointer coöperating with said scales carried by said lever, a second ratchet-wheel above the first-named wheel and carrying a hand coöperating with the circular scale, spring-pawls or back-stops for said wheels and a spring-dog carried by said first-named wheel and coöp- erating with the pawl of the other wheel to turn said wheel through the space of one tooth with each complete revolution of the other wheel.

9. In a lumber-register, the combination with the casing, of a dial provided with a circular scale and segmental scales coöperating therewith, of a shaft journaled in the casing, a ratchet-wheel and a hand carried by said shaft, coöperating with the circular scale, a lever pivoted on the shaft and carrying pawls engaging said wheel, a double pointer carried by said lever coöperating with the circular and segmental scales with its opposite ends, a ratchet-wheel sleeved on the shaft, a hand carried by the sleeve of the wheel coöperating with the circular scale, spring-pawls for said wheels, and a spring-dog carried by one wheel and coöperating with the pawl of the other wheel to turn said wheel through the space of one tooth with each complete revolution of the other wheel.

10. In a lumber-register, the combination with the casing, of a dial having a segmental slot, a circular scale on one side of said slot giving the area in feet and segmental scales of different lengths on the other side of said slot giving the various widths in inches, a shaft journaled in the casing, a ratchet-wheel and hand registering the number of feet on the circular side carried by said shaft, a lever, a double pointer and spring-pawls carried by said lever coöperating with the scales and wheel respectively, a sleeve on the shaft, a second ratchet-wheel and hand registering the number of hundreds of feet on the circular scale carried by said sleeve, spring-pawls or back-stops engaging said wheels and a spring-dog carried by the wheel on the shaft and coöperating with the spring-pawl of the other wheel to impart a step-by-step movement for the purpose described.

11. In a lumber-register, the combination of a casing having an open front and integrally formed with lugs for attachment to a scaling-stick, a graduated dial supported in said casing, a shaft journaled in said casing, a hand and ratchet-wheel carried by said shaft, an operating-lever pivoted on said shaft, a double pointer and pawl carried by said lever, said pawl adapted to engage the teeth of said wheel, a sleeve on the shaft, a hand and a ratchet-wheel carried by said sleeve, a spring-pawl engaging said wheel and a spring-dog carried by the other wheel coöperating therewith.

In testimony whereof I affix my signature in presence of two witnesses.

JOHN C. HURLEY.

Witnesses:
OTTO F. BARTHEL,
OLIVER E. BARTHEL.